(12) United States Patent
Lucente et al.

(10) Patent No.: US 8,931,330 B2
(45) Date of Patent: Jan. 13, 2015

(54) METHOD AND DEVICE FOR DETECTING LEAKS IN AN UNDERGROUND LIQUID PIPE, PARTICULARLY A WATER PIPE

(75) Inventors: Diego Lucente, Saint-Cloud (FR); Ignacio Calsals Del Busto, Alicante (ES); Jean-Pierre Deletoille, Sartrouville (FR)

(73) Assignee: R+I Alliance (FR)

( * ) Notice: Subject to any disclaimer, the term of this patent is extended or adjusted under 35 U.S.C. 154(b) by 778 days.

(21) Appl. No.: 13/062,811

(22) PCT Filed: Sep. 8, 2009

(86) PCT No.: PCT/IB2009/053907
§ 371 (c)(1),
(2), (4) Date: May 23, 2011

(87) PCT Pub. No.: WO2010/029495
PCT Pub. Date: Mar. 18, 2010

(65) Prior Publication Data
US 2011/0219855 A1  Sep. 15, 2011

(30) Foreign Application Priority Data
Sep. 9, 2008 (FR) .................................... 08 04940

(51) Int. Cl.
*G01M 3/08* (2006.01)
*G01M 3/22* (2006.01)

(52) U.S. Cl.
CPC .................................. *G01M 3/22* (2013.01)
USPC ....................................... 73/40.7; 73/40.5 R

(58) Field of Classification Search
CPC ...................................................... G01M 3/22
USPC .................................. 73/40 R, 7, 40.7, 49.2
See application file for complete search history.

(56) References Cited

U.S. PATENT DOCUMENTS

| | | | | |
|---|---|---|---|---|
| 3,470,397 A | * | 9/1969 | Bloch et al. | 310/11 |
| 3,645,127 A | * | 2/1972 | Mongodin et al. | 73/40.7 |
| 4,189,938 A | * | 2/1980 | Heim | 73/40.7 |
| 4,294,106 A | * | 10/1981 | Gevaud et al. | 73/40.7 |
| 4,523,453 A | * | 6/1985 | Faul et al. | 73/40.7 |
| 4,534,709 A | * | 8/1985 | Nielsen | 417/65 |
| 4,591,331 A | * | 5/1986 | Moore | 431/16 |
| 4,625,570 A | * | 12/1986 | Witherspoon et al. | 73/863.81 |
| 4,647,376 A | * | 3/1987 | Galaj | 210/297 |
| 4,709,577 A | * | 12/1987 | Thompson | 73/40.7 |
| 4,725,551 A | * | 2/1988 | Thompson | 436/3 |

(Continued)

FOREIGN PATENT DOCUMENTS

| | | |
|---|---|---|
| DE | 4127543 A1 | 2/1993 |
| DE | 4313681 C1 | 8/1994 |

(Continued)

*Primary Examiner* — John Fitzgerald
(74) *Attorney, Agent, or Firm* — The Belles Group, P.C.

(57) ABSTRACT

The invention relates to a method for detecting leaks in an underground liquid pipe (T), particularly a water pipe, into which a gas is fed through a diffuser (8) into the liquid of the pipe, the atmospheric content of the gas being low; and the path of the pipe is traced along the pipe surface with a detection system for measuring at consecutive points the content of the air in the injected gas, an abnormally high content constituting a leak indicator. A diffuser (8) is selected having outlet pores for the gas, the mean diameter of which is less than 50 µm so as to produce gas bubbles, the diameter of which is small.

17 Claims, 3 Drawing Sheets

(56) References Cited

U.S. PATENT DOCUMENTS

| | | | |
|---|---|---|---|
| 4,752,421 A * | 6/1988 | Makino | 261/77 |
| 5,038,853 A * | 8/1991 | Callaway et al. | 165/46 |
| 5,046,353 A * | 9/1991 | Thompson | 73/40.7 |
| 5,375,457 A * | 12/1994 | Trapp | 73/40.7 |
| 5,767,390 A * | 6/1998 | Chapman, IV | 73/40.7 |
| 5,798,696 A * | 8/1998 | Wong | 340/605 |
| 5,879,928 A * | 3/1999 | Dale et al. | 435/264 |
| 5,922,943 A * | 7/1999 | Chapman, IV | 73/40.7 |
| 6,035,701 A * | 3/2000 | Lowry et al. | 73/40.7 |
| 6,209,855 B1* | 4/2001 | Glassford | 261/28 |
| 6,365,044 B1* | 4/2002 | Crane | 210/248 |
| 6,412,447 B1* | 7/2002 | Trant et al. | 122/14.21 |
| 6,601,454 B1* | 8/2003 | Botnan | 73/756 |
| 6,608,490 B1* | 8/2003 | Tombini | 324/692 |
| 6,817,227 B2* | 11/2004 | Thompson et al. | 73/40.7 |
| 6,907,771 B2* | 6/2005 | Finlay et al. | 73/40.7 |
| 7,007,545 B1 | 3/2006 | Martinek | |
| 7,051,604 B1* | 5/2006 | Mayeaux | 73/863.12 |
| 7,186,286 B2* | 3/2007 | Morse | 55/417 |
| 7,270,019 B2* | 9/2007 | Issel | 73/863.23 |
| 7,444,854 B2* | 11/2008 | Bohm et al. | 73/40.7 |
| 7,497,110 B2* | 3/2009 | Liepert | 73/40.7 |
| 7,658,787 B2* | 2/2010 | Morse et al. | 95/273 |
| 7,666,313 B2* | 2/2010 | Kerfoot | 210/747.8 |
| 7,681,867 B2* | 3/2010 | Hu et al. | 261/62 |
| 7,832,255 B2* | 11/2010 | Sasaki et al. | 73/40.7 |
| 2002/0000226 A1* | 1/2002 | Butnor et al. | 128/200.24 |
| 2002/0050478 A1* | 5/2002 | Talbert et al. | 210/742 |
| 2003/0037596 A1* | 2/2003 | Sorensen | 73/40.7 |
| 2003/0071069 A1* | 4/2003 | Shelton | 222/190 |
| 2004/0003653 A1* | 1/2004 | Avila | 73/40.7 |
| 2004/0069046 A1* | 4/2004 | Sunshine et al. | 73/23.34 |
| 2005/0044930 A1* | 3/2005 | Finlay et al. | 73/40.7 |
| 2006/0107731 A1* | 5/2006 | Thomas | 73/49.2 |
| 2007/0051165 A1* | 3/2007 | Maresca et al. | 73/40.5 R |
| 2007/0209425 A1* | 9/2007 | Shibata et al. | 73/40 |
| 2008/0014350 A1* | 1/2008 | Carlson et al. | 427/255.21 |
| 2008/0202212 A1* | 8/2008 | Liepert | 73/40.7 |
| 2009/0008807 A1* | 1/2009 | Schneider | 261/124 |
| 2009/0188302 A1* | 7/2009 | Rolff et al. | 73/40.7 |
| 2009/0293592 A1* | 12/2009 | Mellone et al. | 73/40.7 |
| 2010/0005861 A1* | 1/2010 | Wetzig et al. | 73/40.7 |
| 2010/0078372 A1* | 4/2010 | Kerfoot | 210/150 |
| 2010/0132812 A1* | 6/2010 | Boughman | 137/414 |
| 2010/0181263 A1* | 7/2010 | Buch et al. | 210/758 |
| 2010/0213124 A1* | 8/2010 | Takabatake et al. | 210/636 |
| 2010/0288020 A1* | 11/2010 | Enquist | 73/40.7 |
| 2011/0219855 A1* | 9/2011 | Lucente et al. | 73/40.7 |
| 2013/0292857 A1* | 11/2013 | Connors | 261/30 |

FOREIGN PATENT DOCUMENTS

| | | | | |
|---|---|---|---|---|
| EP | 150266 A2 * | 8/1985 | | G01M 3/20 |
| FR | 2729468 A1 | 7/1996 | | |
| FR | 2909764 A1 | 6/2008 | | |
| GB | 2338072 A | 12/1999 | | |
| GB | 2338072 A * | 12/1999 | | G01M 3/22 |
| WO | WO 8603836 A1 * | 7/1986 | | G01M 3/22 |
| WO | WO-0192607 A1 | 12/2001 | | |

* cited by examiner

METHOD AND DEVICE FOR DETECTING LEAKS IN AN UNDERGROUND LIQUID PIPE, PARTICULARLY A WATER PIPE

CROSS REFERENCE TO RELATED APPLICATIONS

This application is a National Phase filing under 35 U.S.C. §371 of PCT/IB2009/053907 filed on Sep. 8, 2009; and this application claims priority to Application No. 0804940 filed in France on Sep. 9, 2008 under 35 U.S.C. §119; the entire contents of all are hereby incorporated by reference.

The invention relates to a method of detecting leaks in an underground liquid duct, according to which:
  a diffuser is used to inject a gas into the liquid of the duct, the gas having a low atmospheric content,
  and the path of the duct is traced on the surface with a detection system for measuring at successive points the air content in the injected gas, an abnormally high content constituting a leak indicator.

The invention relates more particularly to the detection of leaks in water ducts. The injected gas is usually helium.

DE 38 24 172 discloses such a method. The injection of the gas into the water of the duct is performed using a tap connection involving a chamber into which the liquid is sprayed and the gas is injected. This gas injection method is relatively complicated, and the diffusion of the gas into the liquid is not entirely satisfactory.

FR 2 729 468 relates to a detection method of the same type. The injection of the gas into the liquid involves a mixing device consisting of a tank linked to the water distribution network, the bottom part of the tank being provided with a diffuser tube which is in communication with helium supply means. As in the preceding case, the gas injection means are relatively complicated to put in place, and the gas diffusion is not entirely satisfactory. The detection system is relatively heavy and involves a mass spectrometer.

GB 2 338 072 relates to a method of detecting leaks in an underground liquid duct, in particular a water duct, according to which a gas is injected into the liquid of the duct via a diffuser. A vehicle equipped with means of detecting the gas, namely helium, is moved on the surface of the ground along the path of the duct. The detection equipment includes a mass spectrometer. It is stated that it is preferable to prepare a helium-saturated solution and to inject it into the ducting. To this end, the injection takes place in a branch loop on the ducting. No indication is given as to the mean diameter of the outlet pores of the diffuser for the gas. The diffusers do not show link means enabling them to be moved and inserted in a leaktight manner at a point of the duct.

Above all, the aim of the invention is to provide a method of detecting leaks in an underground liquid duct, of the type defined previously, which is simple and quick to implement, and which makes it possible to improve the diffusion of the gas into the liquid, and thus improve the leak detection. In practice, if the diffusion of the gas is not done in good conditions, gas pockets may form in the duct, and gas may escape from a coupling between two ducts, even though this coupling is watertight. False indications may thus result therefrom.

According to a first aspect of the invention, a method of detecting leaks of the type defined previously is characterized in that a diffuser is selected that has outlet pores for the gas with the mean diameter being less than 50 µm to produce gas bubbles with a small diameter. Preferably, the mean diameter of the outlet pores of the diffuser is less than or equal to 20 µm.

According to another aspect of the invention, which may be used independently or in combination with the previous one, the diffuser is linked to a pressurized gas inlet via link means enabling the diffuser to be moved, and the diffuser is inserted in a leaktight manner at a point of the duct to inject the gas directly into the duct.

Advantageously, the diffuser is installed in a rigid cylindrical jacket, one end of which is open and includes means of linking in a leaktight manner to a full-bore valve orifice, while the other end of the jacket is passed through in a leaktight sliding manner by a pipe for feeding gas to the diffuser,
  the jacket is linked in a leaktight manner to the valve orifice, the latter being closed,
  the valve is opened and the diffuser is inserted into the duct by passing it through the open valve.

The diffuser can be oriented in the duct in a diametral direction, or in a direction parallel to the axis of the duct.

The diffuser may be rigid and made of sintered metal, notably of sintered steel, or of ceramic or of graphite, or another material that is equivalent in terms of porosity.

As a variant, the diffuser may be flexible, and notably made of silicone rubber or of polyethylene.

For the detection, a detection system is advantageously used that comprises a suction cup designed to be placed on the surface of the ground, this cup being linked to a portable suction pump, which directs the sucked mixture towards a portable detector for detecting the injected gas.

The invention also relates to a device for detecting leaks in an underground liquid duct, for implementing the method defined previously, this device comprising a diffuser of gas into the liquid and being characterized in that this diffuser has gas outlet pores that have a mean diameter of less than 50 µm, preferably less than or equal to 20 µm.

According to another aspect of the invention, which may be used independently or in combination with the previous one, the diffuser is linked to a pressurized gas inlet via link means enabling the diffuser to be moved, which is mounted in a rigid cylindrical jacket, one end of which is open and includes means of linking in a leaktight manner to a full-bore valve orifice, while the other end of the jacket is passed through in a leaktight sliding manner by a pipe for feeding gas to the diffuser.

The means of linking the diffuser with the gas inlet advantageously consist of a flexible pipe.

Preferably, the detection device includes a gas detection system which comprises a portable pump, the intake orifice of which is linked to a suction cup designed to be placed on the ground. The discharge of the pump is linked to a portable gas detector. A portable digital device is designed to record the results supplied by the detector. A GPS unit is advantageously provided to make it possible to locate the inspected points, and supply this information to the digital device.

The detection device according to the invention consists of portable elements which facilitate the operations.

Apart from the provisions explained hereinabove, the invention consists of a certain number of other provisions which will be explained more explicitly hereinbelow with regard to an exemplary embodiment described with reference to the appended drawings, but which is in no way limiting. In these drawings.

The method and the device for detecting leaks in liquid ducts, notably water ducts, according to the invention, are based on the use of a tracer gas, preferably helium. The method can be used in ducts that are in service, without there being any need to interrupt the distribution of water in the duct. The device for implementing the method comprises a gas injection device designed to ensure optimum dissolution of the gas in the liquid, and a gas detection system, relatively light and portable to make it possible to identify and locate concentrations of helium or, more generally of tracer gas, that are higher than those of the atmosphere in normal conditions. The gas detection system also comprises means of recording results.

Figure 1:
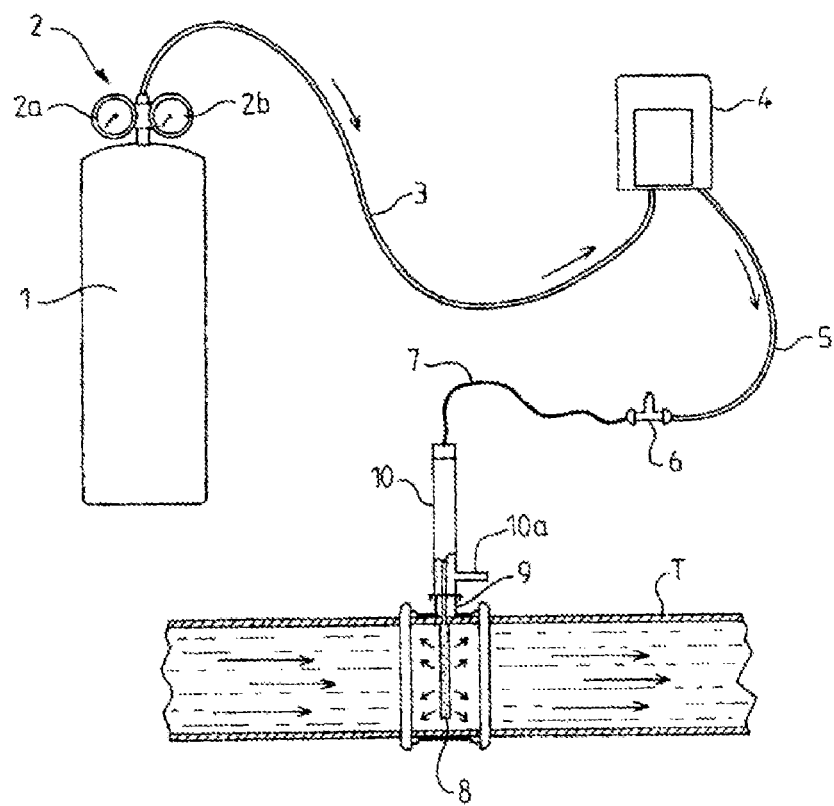
FIG. 1 is a diagram of the gas injection device for implementing the method according to the invention.

As can be seen in FIG. 1, the device for injecting the gas into the liquid of the duct comprises a helium tank 1, usually in the form of a pressurized cylinder, equipped with a pressure reducing valve 2 with pressure gauge 2a giving the pressure upstream of the pressure reducing valve 2, that is to say the pressure of the tank 1, and pressure gauge 2b downstream, that is to say at the outlet of the pressure reducing valve 2. A flexible pipe 3 links the outlet of the pressure reducing valve 2 to a regulator 4, designed to control the gas flow rate. The regulator 4 may be a volume flow rate or mass flow rate regulator.

The outlet of the regulator 4 is linked, by a flexible pipe 5, to a connection member 6, provided with a non-return system. The connection member 6 is connected to another flexible pipe 7 of which the end remote from the member 6 is linked, either directly or by an intermediate pipe, to a diffuser 8.

The diffuser 8 has outlet pores for the gas that have a mean diameter of less than 50 µm to produce gas bubbles with a small diameter, in particular less than 300 µm. Good results have been obtained with a diffuser that has pores that have a mean diameter of approximately 13 µm. Generally, the diffuser 8 has a cylindrical shape, the diameter of which is sufficiently small to be able to pass through a full-bore valve 9 (see FIGS. 3 and 4) with a diameter at least equal to 30 mm.

The diffuser 8 may be rigid, and made of a sintered metal, notably sintered steel, or of ceramic material, or of graphite, or of equivalent material that has the desired porosity.

It is also possible to envisage flexible diffusers, notably made of silicone rubber, polyethylene or equivalent material. Such flexible diffusers will preferably be used when the points of access to the duct T make it difficult, or impossible, to insert a rigid diffuser.

Figures 3, 4:
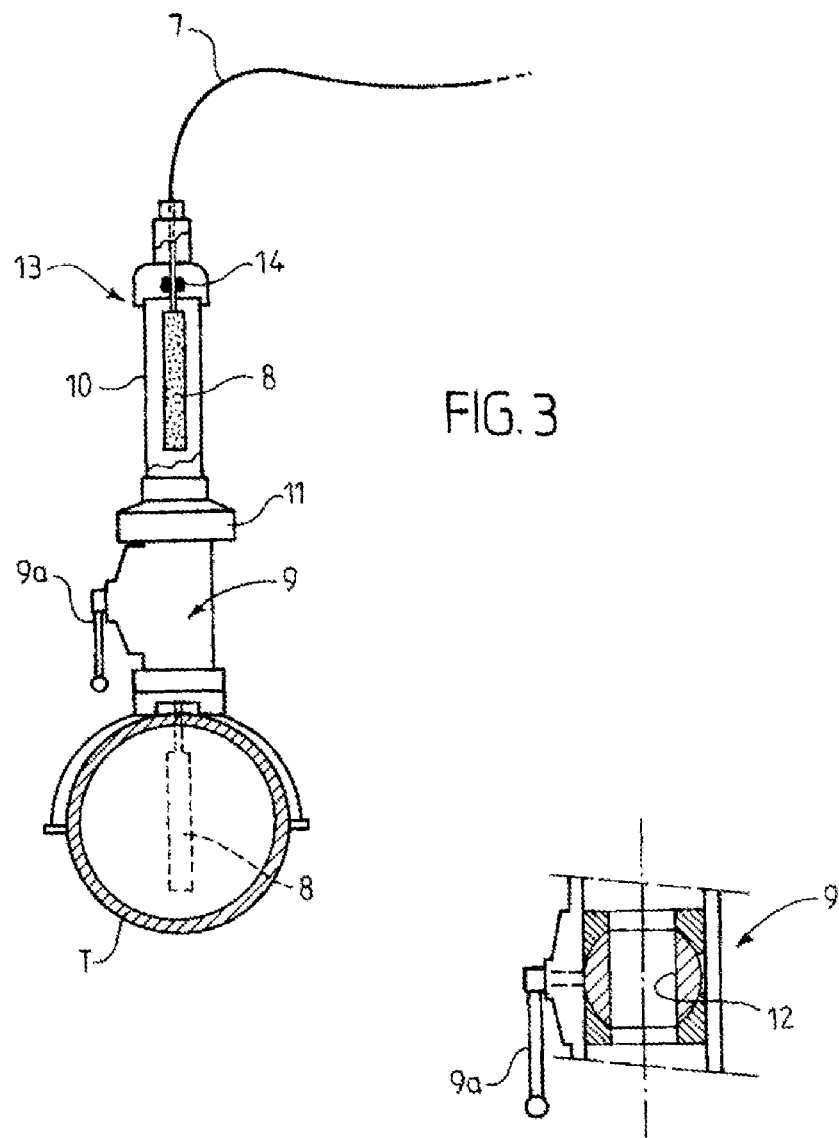
FIG. 3 is a schematic view with cutaway parts for the placement of the diffuser in a duct.
FIG. 4 is a cross-sectional schematic view of a full-bore globe valve.

As can be seen in FIG. 3, the diffuser 8 is installed in a rigid cylindrical jacket 10, an open end 11 of which is provided with means of coupling, threading or tapping type, to an orifice of a valve 9. This valve is of the full-bore type and comprises (FIG. 4) a closure member consisting of a sphere portion passed through along a diameter by a bore 12 which can be aligned, in the open position, with the inlet and outlet orifices of the valve. A quarter-turn rotation of the closure member controlled by an external handle 9a can be used to close the valve. The diameter of the diffuser 8 is less than the diameter of the bore 12 so that the diffuser 8 can pass through the bore 12 when the valve 9 is in the open position.

The pipe 7 connecting the diffuser 8 passes through the other end 13 of the jacket 10 in a leaktight sliding manner, by virtue of an O-ring seal 14, in particular an inflatable O-ring seal. It is thus possible to push or pull the pipe 7 through the end 13, in a leaktight manner, and move the diffuser 8 accordingly.

In the transport or rest position, the diffuser 8 is entirely housed inside the jacket 10, the length of which is greater than that of the diffuser 8.

The diffuser 8 can be inserted into the duct T at any accessible point, or any point made accessible, that has an inlet orifice into the duct such as a discharge or bleed orifice, or an orifice for a service link. It is essential, however, that the diameter of this orifice be sufficient to allow the diffuser 8 to pass. If this orifice is equipped with a valve of the type of the valve 9 (FIG. 3), the jacket 10 can be linked directly to the valve 9. Otherwise, a valve 9 is installed on the access orifice. In the case where no access is present on the duct T, an orifice would be made, with the installation of a valve 9, for the insertion of the diffuser 8.

In the case of a rigid diffuser 8, it is desirable to keep it in the duct in a diametral position, transversal to the fluid flow.

Figure 2:
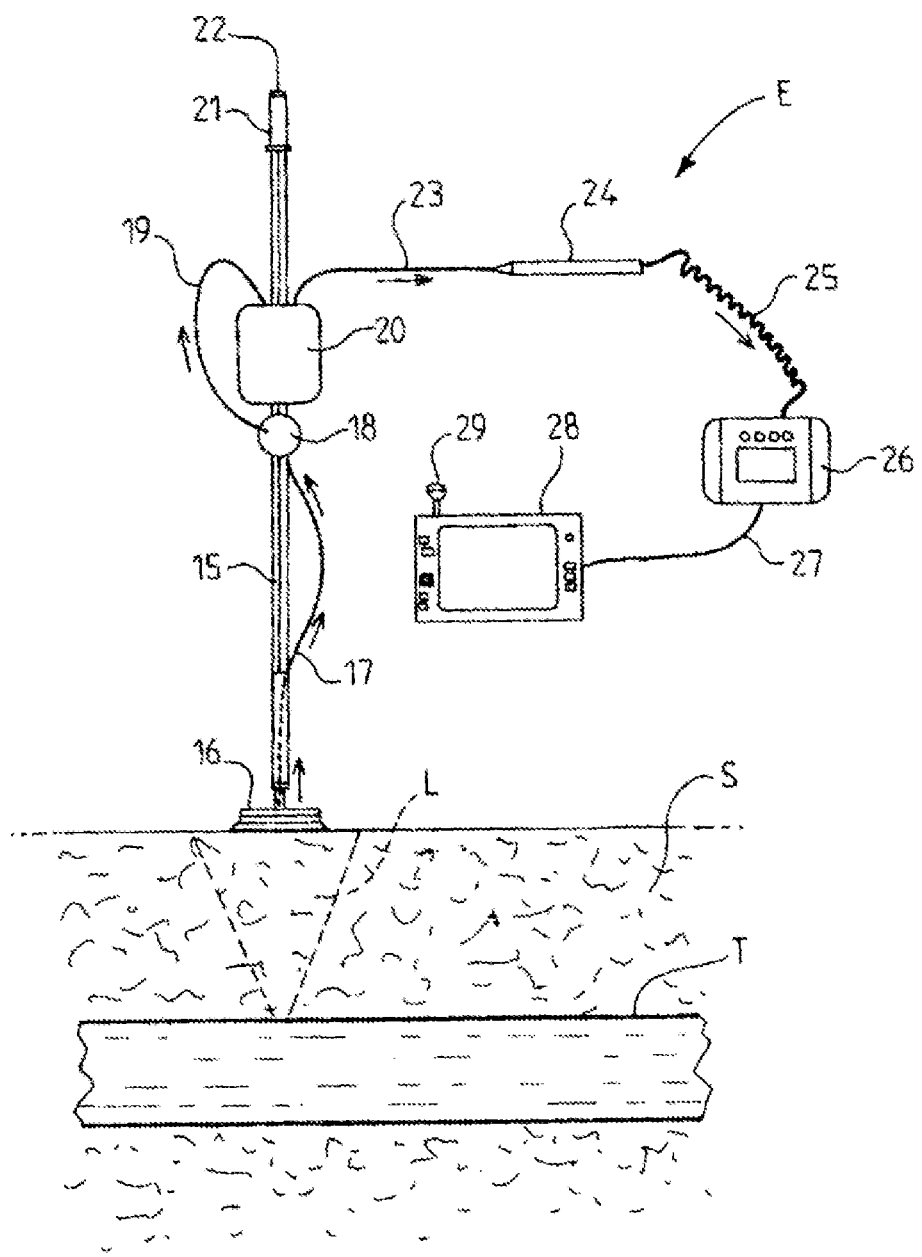
FIG. 2 is a diagram of the gas detection system.

The leak detection device comprises, in addition to the injection device illustrated in FIGS. 1 and 3, a system E for detecting the tracer gas, namely helium in the example considered, illustrated in FIG. 2.

This detection system E is designed to be capable of accommodating and of analyzing traces of helium present in the ground at the point where a leak occurs in the duct T. the detection system E is also designed to record the inspection data and locate the point where this inspection has taken place. To this end, the detection system E comprises the components described hereinbelow.

A portable sniffer extension pipe 15 comprises, at its bottom end, a suction cup 16 in the form of an inverted dish provided on its peripheral edge with a sealing skirt which can be applied to the ground S. The top part of the cup 16 is closed by a disk comprising, at its center, a suction orifice to which is connected in a leaktight manner a flexible pipe 17.

The cup 16 is installed in a removable manner at the end of the extension pipe 15 so that the operator can choose, from a number of available cups, the one that is best suited to the configuration of the ground to be inspected.

The flexible pipe 17 is linked to one or more dust and moisture filters 18, supported by the extension pipe 15. The outlet of the filter 18 is linked by a flexible pipe 19 to the suction orifice of a portable pump 20 mounted in the top part of the extension pipe 15. A battery, or electric cells, 21 supplying the pump 20 are provided in the top part of the extension pipe 15 with a switch 22.

A flexible pipe 23 is connected to the discharge orifice of the pump 20. The pipe 23 is linked by a coupling element 24 to a helically-wound extendable pipe 25. The pipe 25 is linked to a portable helium detector 26, available on the market (examples: model PHD-4 marketed by Varian, model PICO marketed by MKS, etc.), with a sensitivity equal to, or better than, 5 ppm (parts per million) of helium in air.

The information supplied by the detector 26 is transmitted, by a cable 27, to a portable digital device 28 for the data to be recorded. The device 28 may be a PDA (personal digital assistant), or a portable PC computer, or a tablet PC, or a UMPC (ultramobile PC) or any other digital data collector. The digital device 28 allows for continuous recording of the results (helium concentration levels), and their graphic representation.

Furthermore, a GPS (global positioning system) unit 29 is provided to enable the inspected points to be located. This component 29 may be an external element or a part integrated in the portable digital device 28. The output signals from the GPS 29 are recorded by the digital device 28 simultaneously with the output signals from the detector 26, so that the time and the place of the measurement are added to the inspection results.

The detector 26 and the digital device 28 may be carried over the shoulder, using a strap that is not represented, by an operator who moves on the ground while holding the extension pipe 15.

A leak detection is performed as follows.

To insert the diffuser 8 into the ducting T, an insertion point (valve, discharge, service connection) is chosen that has a bore diameter greater than the diameter of the diffuser 8, or generally greater than 30 mm. This insertion point is equipped with a valve 9, of the sphere or closure member type, which leaves a full bore in the open position.

When the valve 9 is in the closed position, the jacket 10 (FIG. 3), containing the diffuser 8, is connected in a leaktight manner to the orifice of the valve 9 away from the duct T.

The valve 9 is then opened so that the water from the duct P fills the jacket 10, the air of which is evacuated by virtue of a bleed valve 10a (FIG. 1).

The diffuser 8 is then inserted into the duct T by pushing the flexible pipe 7 in a leaktight manner through the O-ring seal 14. In the case of an inflatable seal 14, the pressure in the seal can be reduced to facilitate the sliding, until the diffuser 8 is in place in the duct T. The pressure is then once again increased in the O-ring seal 14.

When the installation of the diffuser 8 in the duct T is finished, a flow of helium is admitted by acting on the control 4. The optimum gas flow is linked to the flow of water inside the duct T by Henry's law:

$$C_{aq} = H \times P_{gas}$$

a formula in which:
$P_{gas}$ is the partial helium pressure (expressed in atmospheres);
H is a constant dependent on the temperature, different for each gas. Its value for helium at 25° is $3.7.10^{-4}$ mol m$^{-3}$ atm$^{-1}$;
$C_{aq}$ is the balance concentration of the gas (mol/m$^3$).

The gas injection is maintained for the time that is considered necessary to mark the water that is flowing in the duct T.

Because the diffuser 8 is arranged directly in the duct and it includes small diameter outlet orifices, the gas bubbles are themselves of small diameter and rapidly dissolve in the liquid. The detection on the surface can begin at a short distance, a few meters, downstream of the injection point. According to the prior art techniques, the diffusion and the dissolution of the helium in the water took longer to obtain so that the measurements could begin only at a few hundred meters from the injection point.

If a leak is present at any point downstream of the injection into the water distribution network, the water marked by the dissolved helium will flow into the ground through the leak. A phase of desorption of the helium (a phenomenon that is the reverse of dissolution) will occur and slowly release the helium into the ground. The helium is significantly less volatile than hydrogen and remains in the ground for longer before being evacuated into the atmosphere. In practice, it is possible to work up to 5 days after the injection of helium into the water to perform leak detection operations.

When the injection is finished, the inspection to determine the leak or leaks is performed by an operator who moves by walking on the ground S, with the detection system E of FIG. 2, above the path of the pipe T.

Samples of air trapped in the ground are taken by placing the detection cup 16 at successive points and activating the pump 20 and the detector 26. The distance between the successive points of application of the cup 16 may be of the order of 5 meters. However, this distance depends on the trench depth of the duct T, on the characteristics of the ground S, on the assumed importance of the leak and on the time that has elapsed since the injection. All these parameters affect the angle of the diffusion cone L (FIG. 2).

The application of the cup 16 on the ground must be performed in a manner that is as leaktight as possible. The switch of the pump 20 is actuated for a few seconds, for example 10 seconds, and the sucked air is sent into the detector 26. The helium concentration levels can be read directly on the detector or on a digital data recorder. Any helium concentration greater than the normal concentration in the atmosphere (5 ppm) can be considered as a leak indicator.

The results of the leak inspection are recorded and located by the portable device 28. They can then be reexamined later, and be presented in a geographic information system (GIS).

The detection device of the invention can also be used for unpressurized closed ducting in which water circulates.

The concentration of the helium dissolved in the water of the duct T can be estimated, and it is thus possible to envisage establishing a relationship between the value of the helium concentration supplied by the detector 26 and the scale of the water leak.

The invention makes it possible, with a portable device, to detect leaks in ducting that is in service, with no interruption to the supply of water to the users. The use of an internal diffuser 8 with pores with a diameter less than 50 μm, preferably equal to or less than 20 μm, and its arrangement directly in the duct, enhance the dissolution of the gas. This factor is critical for a number of reasons:

an accumulation of undissolved gas may affect the normal operation of the network;
the presence of undissolved helium may lead to false leak detections because the gas may escape through joint defects or similar that are too small for a water leak to occur;
undissolved gas may escape in large quantities through the vents, and be lost to the leak detection;
undissolved gas will have a tendency to follow an upward path along the network, and not follow the flow of the water;
undissolved gas accumulates at high points, and is lost to the leak detection;
a better dissolution reduces the quantity of gas required for the leak detection.

Because the detection device is portable, it can be used in most situations. The connection of the detector to a digital data device allows for a continuous recording of the inspection results for subsequent examination. The time and the position of the sampling added to the helium concentration level data allow for a geographic representation thereof and provide particularly advantageous additional information.

The invention claimed is:

1. A method of detecting leaks in an underground liquid duct according to which:
a diffuser is used to inject a gas into the liquid of the duct, and the path of the duct is traced on the surface with a detection system for measuring at successive points a localized atmospheric content of the injected gas, the localized atmospheric content being higher than the known atmospheric content constituting a leak indicator,
wherein a diffuser is selected that has outlet pores for the gas with the mean diameter being less than 50 μm to produce gas bubbles with a small diameter, and wherein:
the diffuser is installed in a rigid cylindrical jacket, one end of which is open and includes means of linking in a leaktight manner to a full-bore valve orifice, while the other end of the jacket is passed through in a leaktight sliding manner by a pipe for feeding gas to the diffuser,
the jacket is linked in a leaktight manner to the valve orifice, the latter being closed, the valve is opened and the diffuser is inserted into the duct by passing it through the open valve.

2. The method as claimed in claim 1, wherein the mean diameter of the outlet pores of the diffuser is less than or equal to 20 µm.

3. The method as claimed in claim 1, wherein the diffuser is rigid and made of sintered metal.

4. The method as claimed in claim 1, wherein the diffuser is flexible and comprises one of silicone rubber or polyethylene.

5. The method as claimed in claim 1, wherein, for the detection, a detection system is used that comprises a suction cup designed to be placed on the surface of the ground, this cup being linked to a portable suction pump, which directs the sucked mixture toward a portable detector for detecting the injected gas.

6. A method of detecting leaks in an underground liquid duct according to which:
   a diffuser is used to inject a gas into the liquid of the duct, the gas having a known atmospheric content,
   and the path of the duct is traced on the surface with a detection system for measuring at successive points a localized atmospheric content of the injected gas, the localized atmospheric content being higher than the known atmospheric content constituting a leak indicator,
   wherein the diffuser is linked to a pressurized gas inlet via link means enabling the diffuser to be moved, and the diffuser is slidably inserted in a leaktight manner through a sealable valve into the duct to inject the gas directly into the duct.

7. The method as claimed in claim 6, wherein, for the detection, a detection system is used that comprises a suction cup designed to be placed on the surface of the ground, this cup being linked to a portable suction pump, which directs the sucked mixture toward a portable detector for detecting the injected gas.

8. The method as claimed in claim 6, wherein:
   the diffuser is installed in a rigid cylindrical jacket, one end of which is open and includes means of linking in a leaktight manner to a full-bore valve orifice of the sealable valve, while the other end of the jacket is passed through in a leaktight sliding manner by a pipe for feeding gas to the diffuser,
   the jacket is linked in a leaktight manner to the valve orifice, the latter being closed,
   the valve is opened and the diffuser is inserted into the duct by passing it through the open valve.

9. The method as claimed in claim 6, wherein the diffuser is rigid and made of sintered metal.

10. The method as claimed in claim 9, wherein the diffuser is made of sintered steel.

11. The method as claimed in claim 6, wherein the diffuser is flexible.

12. The method as claimed in claim 11, wherein the diffuser is made of silicone rubber or polyethylene.

13. A device for detecting leaks in an underground liquid duct, the device comprising:
   a valve having a full-bore orifice, the valve coupled to the duct;
   a diffuser configured to inject gas into the liquid and coupled to a pressurized gas inlet by a pipe; and
   a cylindrical jacket in which the diffuser is slidably disposed, the cylindrical jacket having one end sealably coupled to the valve and the other end slidably and sealingly coupled to the pipe which feeds gas to the diffuser,
   wherein the diffuser and the full-bore orifice of the valve are respectively configured so that the diffuser is slidable through the full-bore orifice into the duct.

14. The device as claimed in claim 13, wherein the pipe comprises a flexible pipe.

15. The device as claimed in claim 13, further comprising a gas detection system comprising a portable pump, the intake orifice of which is linked to a suction cup designed to be placed on the ground, the discharge of the pump being linked to a portable gas detector.

16. The device as claimed in claim 15, wherein the gas detection system comprises a portable digital device designed to record the results supplied by the detector.

17. The device as claimed in claim 16, wherein a GPS unit is provided to make it possible to locate the inspected points, and supply this information to the digital device.

* * * * *